(12) United States Patent
Oshitari et al.

(10) Patent No.: US 9,865,869 B2
(45) Date of Patent: Jan. 9, 2018

(54) ELECTRODE MATERIAL FOR LITHIUM-ION SECONDARY BATTERY AND METHOD FOR MANUFACTURING SAME

(71) Applicant: Sumitomo Osaka Cement Co., Ltd, Tokyo (JP)

(72) Inventors: Satoru Oshitari, Tokyo (JP); Masataka Oyama, Tokyo (JP); Ryuuta Yamaya, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 15/282,210

(22) Filed: Sep. 30, 2016

(65) Prior Publication Data

US 2017/0288213 A1    Oct. 5, 2017

(30) Foreign Application Priority Data

Mar. 29, 2016    (JP) .................................. 2016-065564

(51) Int. Cl.
| | |
|---|---|
| *H01M 4/88* | (2006.01) |
| *H01M 4/36* | (2006.01) |
| *C01B 25/37* | (2006.01) |
| *H01M 4/58* | (2010.01) |
| *H01M 4/133* | (2010.01) |
| *H01M 4/136* | (2010.01) |
| *H01M 4/1393* | (2010.01) |
| *H01M 4/1397* | (2010.01) |
| *H01M 4/587* | (2010.01) |
| *H01M 10/0525* | (2010.01) |

(52) U.S. Cl.
CPC ........... *H01M 4/366* (2013.01); *C01B 25/377* (2013.01); *H01M 4/133* (2013.01); *H01M 4/136* (2013.01); *H01M 4/1393* (2013.01); *H01M 4/1397* (2013.01); *H01M 4/587* (2013.01); *H01M 4/5825* (2013.01); *H01M 10/0525* (2013.01)

(58) Field of Classification Search
CPC ............ H01M 4/20; H01M 4/36; H01M 4/58; H01M 4/62; C01B 25/37

USPC ..... 25/182.1, 506; 429/221, 232; 252/182.1, 252/506
See application file for complete search history.

(56) References Cited

U.S. PATENT DOCUMENTS

2010/0261063 A1*   10/2010   Kitagawa ................ C01B 25/37
                                                    429/232
2011/0017947 A1    1/2011   Nuspl et al.

FOREIGN PATENT DOCUMENTS

| JP | 2013101883 A | 5/2013 |
| JP | 5928648 B1 | 5/2016 |
| WO | WO 2014/135923 A1 | 9/2014 |

OTHER PUBLICATIONS

Japanese Office Action with English translation for Japanese Application No. 2016-065564 dated Aug. 16, 2016.
Jongsoon et al., "Mg and Fe Co-doped Mn Based Olivine Cathode Material for High Power Capability," *Journal of the Electrochemical Society*, 158(3):A250-A254 (2011).
Duan et al., "Synthesis of high-performance Fe-Mg-co-doped LiMnPO$_4$/C via a mechano-chemical liquid-phase activation technique," *Ionics*, 22:609-619 (Oct. 27, 2015).
Extended European Search Report for European Patent Application No. 16191612.7 (dated Nov. 11, 2016).

* cited by examiner

*Primary Examiner* — Khanh Tuan Nguyen
(74) *Attorney, Agent, or Firm* — Merchant & Gould P.C.

(57) ABSTRACT

An electrode material for a lithium-ion secondary battery of the present invention includes particles which are made of $LiFe_xMn_{1-w-x-y-z}Mg_yCa_zA_wPO_4$, have an orthorhombic crystal structure, and have a space group of Pmna, in which a mis-fit value $[(1-(b2 \times c2)/(b1 \times c1)) \times 100]$ of a bc plane which is computed from lattice constants b1 and c1 of the $LiFe_xMn_{1-w-x-y-z}Mg_yCa_zA_wPO_4$ and lattice constants b2 and c2 of $Fe_xMn_{1-w-x-y-z}Mg_yCa_zA_wPO_4$ obtained by deintercalating Li from $LiFe_xMn_{1-w-x-y-z}Mg_yCa_zA_wPO_4$ by means of an oxidation treatment using nitrosonium tetrafluoroborate in acetonitrile is 1.32% or more and 1.85% or less.

4 Claims, No Drawings

ELECTRODE MATERIAL FOR LITHIUM-ION SECONDARY BATTERY AND METHOD FOR MANUFACTURING SAME

CROSS-REFERENCE TO RELATED APPLICATIONS

Priority is claimed on Japanese Patent Application No. 2016-065564, filed Mar. 29, 2016, the content of which is incorporated herein by reference.

BACKGROUND OF THE INVENTION

Field of the Invention

The present invention relates to an electrode material for a lithium-ion secondary battery and a method for manufacturing the same.

Description of Related Art

Cathode materials made of $LiMnPO_4$ are materials which can be expected to have a higher battery reaction voltage and an energy density that is approximately 20% higher than cathode materials made of $LiFePO_4$. Therefore, cathode materials made of $LiMnPO_4$ are expected to be used in secondary batteries for electric vehicles.

However, lithium-ion secondary batteries including a cathode which includes the cathode material made of $LiMnPO_4$ have the following problems. (1) The low electron conductivity of bulk $LiMnPO_4$, (2) the low Li diffusivity of bulk $LiMnPO_4$, and (3) the anisotropic and large volume change of $LiMnPO_4$ crystals which is caused by battery reactions attributed to the Jahn-Teller effect of manganese ions ($Mn^{2+}$). Due to these problems, in lithium-ion secondary batteries, the activation energy for intercalating and deintercalating lithium ions into and from cathodes becomes high. As a result, in the lithium-ion secondary batteries, battery characteristics during high-speed charge and discharge significantly degrade.

In order to improve the battery characteristics of lithium-ion secondary batteries during high-speed charge and discharge, active studies are underway regarding $LiFe_xMn_{1-x}PO_4$ ($0 \leq x \leq 1$) in which some of Mn in $LiMnPO_4$ is substituted with Fe (for example, refer to Japanese Laid-open Patent Publication No. 2013-101883). In $LiFe_xMn_{1-x}PO_4$, Fe forms a solid solution, and thus electron conductivity among particles improves more than $LiMnPO_4$. As a result, in lithium-ion secondary batteries including a cathode which includes a cathode material made of $LiFe_xMn_{1-x}PO_4$, charge and discharge performance improves.

SUMMARY OF THE INVENTION

However, there have been no reports regarding any examples in which a cathode material capable of realizing lithium-ion secondary batteries having excellent battery characteristics during high-speed charge and discharge can be obtained using the method described in Japanese Laid-open Patent Publication No. 2013-101883. In order to realize lithium-ion secondary batteries having excellent battery characteristics at a low temperature, it is considered that 50% or more of Mn in $LiMnPO_4$ needs to be substituted with Fe. In a lithium-ion secondary battery for which a cathode material made of $LiFe_xMn_{1-x}PO_4$ having a large substitution amount of Fe is used (hereinafter, referred to as "lithium-ion secondary battery A"), the charge and discharge capacity increases more than in a lithium-ion secondary battery for which a cathode material made of $LiMnPO_4$ is used (hereinafter, referred to as "lithium-ion secondary battery B").

However, in the lithium-ion secondary battery A, the proportion of a battery reaction at a high voltage which is derived from $LiMnPO_4$ decreases, and a battery reaction derived from $LiFePO_4$ increases. Therefore, in the lithium-ion secondary battery A, an effect of improving the energy density which is expected from $LiMnPO_4$ included in the cathode cannot be obtained. Meanwhile, the lithium-ion secondary battery B or a lithium-ion secondary battery for which a cathode material made of $LiFe_xMn_{1-x}PO_4$ having a small substitution amount of Fe is used has the following problems due to the low electron conductivity of the bulk $LiMnPO_4$, the low Li diffusivity of the bulk $LiMnPO_4$, and the Jahn-Teller effect of $Mn^{2+}$ which have been described above. That is, the lithium-ion secondary battery has a problem in that a favorable discharge capacity or a favorable mass energy density cannot be obtained, particularly, at a low temperature or during high-speed charge and discharge.

Therefore, studies are underway regarding $LiFe_xMn_{1-x-y}M_yPO_4$ in which Mn in $LiFe_xMn_{1-x}PO_4$ is further substituted with a divalent metal so that the electric characteristics of $LiFe_xMn_{1-x}PO_4$ further improve and the energy density increases in a case in which $LiFe_xMn_{1-x}PO_4$ is used as an electrode material.

The present invention has been made in consideration of the above-described circumstances, and an object of the present invention is to provide an electrode material for a lithium-ion secondary battery having a high mass energy density at a low temperature or during high-speed charge and discharge.

The present inventors and the like carried out intensive studies in order to solve the above-described problems, consequently, found that, in particles made of $LiFe_xMn_{1-w-x-y-z}Mg_yCa_zA_wPO_4$, when a mis-fit value of a be plane which is computed from the lattice constants b1 and c1 of $LiFe_xMn_{1-w-x-y-z}Mg_yCa_zA_wPO_4$ and the lattice constants b2 and c2 of $Fe_xMn_{1-w-x-y-z}Mg_yCa_zA_wPO_4$ obtained by deintercalating Li from $LiFe_xMn_{1-w-x-y-z}Mg_yCa_zA_wPO_4$ by means of an oxidation treatment using nitrosonium tetrafluoroborate in acetonitrile is set in a predetermined range, what will be described below is caused, and completed the present invention. That is, it was found that low-temperature characteristics and high-speed charge and discharge characteristics can be significantly improved without impairing the high mass energy density of $LiFe_xMn_{1-w-x-y-z}Mg_yCa_zA_wPO_4$ more than necessary.

An electrode material for a lithium-ion secondary battery of the present invention includes particles which are made of $LiFe_xMn_{1-w-x-y-z}Mg_yCa_zA_wPO_4$ (here, A represents at least one element selected from the group consisting of Co, Ni, Zn, Al, and Ga, $0.05 \leq x \leq 0.35$, $0.01 \leq y \leq 0.10$, $0.0001 \leq z \leq 0.001$, and $0 \leq w \leq 0.02$), have an orthorhombic crystal structure, and have a space group of Pmna, in which a mis-fit value $[(1-(b2 \times c2)/(b1 \times c1)) \times 100]$ of a be plane which is computed from lattice constants b1 and c1 of the $LiFe_xMn_{1-w-x-y-z}Mg_yCa_zA_wPO_4$ and lattice constants b2 and c2 of $Fe_xMn_{1-w-x-y-z}Mg_yCa_zA_wPO_4$ obtained by deintercalating Li from $LiFe_xMn_{1-w-x-y-z}Mg_yCa_zA_wPO_4$ by means of an oxidation treatment using nitrosonium tetrafluoroborate in acetonitrile is 1.32% or more and 1.85% or less.

A method for manufacturing an electrode material for a lithium-ion secondary battery of the present invention is a method for manufacturing the electrode material for a lithium-ion secondary battery of the present invention including: a step of heating a raw material slurry α including a Li source, a Fe source, a Mn source, a Mg source, a Ca source, a P source, and an A source to a temperature in a range of 150° C. or higher and 250° C. or lower, thereby synthesizing $LiFe_xMn_{1-w-x-y-z}Mg_yCa_zA_wPO_4$ particles under pressure; a step of drying a raw material slurry β obtained by dispersing the $LiFe_xMn_{1-w-x-y-z}Mg_yCa_zA_wPO_4$ particles in a water solvent including a carbon source, granulating the raw material slurry, and then heating the raw material slurry to a temperature in a range of 500° C. or higher and 860° C. or lower, thereby coating surfaces of $LiFe_xMn_{1-w-x-y-z}Mg_yCa_zA_wPO_4$ particles (primary particles) with a carbonaceous film and obtaining an electrode material for a lithium-ion secondary battery; and a step of mixing the electrode material for a lithium-ion secondary battery with a solution obtained by adding nitrosonium tetrafluoroborate to acetonitrile as an oxidant, thereby performing chemical Li deintercalation and setting a mis-fit value $[(1-(b2\times c2)/(b1\times c1))\times 100]$ of a be plane which is computed from lattice constants b1 and c1 of the $LiFe_xMn_{1-w-x-y-z}Mg_yCa_zA_wPO_4$ and lattice constants b2 and c2 of $Fe_xMn_{1-w-x-y-z}Mg_yCa_zA_wPO_4$ obtained by deintercalating Li from $LiFe_xMn_{1-w-x-y-z}Mg_yCa_zA_wPO_4$ to 1.32% or more and 1.85% or less.

According to the electrode material for a lithium-ion secondary battery of the present invention, it is possible to realize a lithium-ion secondary battery having a high mass energy density at a low temperature or during high-speed charge and discharge.

According to the method for manufacturing an electrode material for a lithium-ion secondary battery of the present invention, it is possible to obtain an electrode material for a lithium-ion secondary battery having a high mass energy density at a low temperature or during high-speed charge and discharge.

DETAILED DESCRIPTION OF THE INVENTION

An embodiment of the electrode material for a lithium-ion secondary battery of the present invention and the method for manufacturing the same will be described.

Meanwhile, the present embodiment is a specific description for easier understanding of the gist of the present invention and, unless particularly otherwise described, does not limit the present invention.

Electrode Material for Lithium-Ion Secondary Battery

An electrode material for a lithium-ion secondary battery of the present embodiment includes particles which are made of $LiFe_xMn_{1-w-x-y-z}Mg_yCa_zA_wPO_4$ (here, A represents at least one element selected from the group consisting of Co, Ni, Zn, Al, and Ga, $0.05 \leq x \leq 0.35$, $0.01 \leq y \leq 0.10$, $0.0001 \leq z \leq 0.001$, and $0 \leq w \leq 0.02$), have an orthorhombic crystal structure, and have a space group of Pmna. In addition, a mis-fit value $[(1-(b2\times c2)/(b1\times c1))\times 100]$ of a be plane which is computed from lattice constants b1 and c1 of the $LiFe_xMn_{1-w-x-y-z}Mg_yCa_zA_wPO_4$ and lattice constants b2 and c2 of $Fe_xMn_{1-w-x-y-z}Mg_yCa_zA_wPO_4$ obtained by deintercalating Li from $LiFe_xMn_{1-w-x-y-z}Mg_yCa_zA_wPO_4$ by means of an oxidation treatment using nitrosonium tetrafluoroborate in acetonitrile is 1.32% or more and 1.85% or less.

The electrode material for a lithium-ion secondary battery of the present embodiment is mainly used as a cathode material for a lithium-ion secondary battery.

In the electrode material for a lithium-ion secondary battery of the present embodiment, the surfaces of primary particles of an electrode active material made of $LiFe_xMn_{1-w-x-y-z}Mg_yCa_zA_wPO_4$ are preferably coated with a carbonaceous film.

The average primary particle diameter of the primary particles of the electrode active material made of $LiFe_xMn_{1-w-x-y-z}Mg_yCa_zA_wPO_4$ is preferably in a range of 40 nm to 500 nm and more preferably in a range of 70 nm to 400 nm.

Here, the reason for setting the average primary particle diameter of the primary particles of $LiFe_xMn_{1-w-x-y-z}Mg_yCa_zA_wPO_4$ particles in the above-described range is as described below. When the average primary particle diameter of $LiFe_xMn_{1-w-x-y-z}Mg_yCa_zA_wPO_4$ particles is 40 nm or more, it is possible to favorably hold crystallinity while preventing the primary particles from becoming excessively small. As a result, it is possible to obtain $LiFe_xMn_{1-w-x-y-z}Mg_yCa_zA_wPO_4$ particles in which the length of a crystal lattice of the $LiFe_xMn_{1-x}Mg_yA_zPO_4$ particle in a b axis direction is distinctively shortened while maintaining the lengths in an a axis direction and in a c axis direction being large. On the other hand, when the average primary particle diameter of the $LiFe_xMn_{1-w-x-y-z}Mg_yCa_zA_wPO_4$ particles is 500 nm or less, the $LiFe_xMn_{1-w-x-y-z}Mg_yCa_zA_wPO_4$ particles are sufficiently miniaturized, and consequently, extremely fine particles having favorable crystallinity can be obtained.

The thickness of the carbonaceous film is preferably in a range of 1 nm to 5 nm.

The reason for setting the thickness of the carbonaceous film in the above-described range is as described below. When the thickness of the carbonaceous film is 1 nm or more, the thickness of the carbonaceous film is sufficient, and thus it is possible to form a film having a desired resistance value. As a result, conductivity does not decrease, and it is possible to ensure conductivity suitable for electrode materials. On the other hand, when the thickness of the carbonaceous film is 5 nm or less, battery activity, for example, the battery capacity per unit mass of the electrode material does not decrease.

The average primary particle diameter of the primary particles of the electrode active material made of $LiFe_xMn_{1-w-x-y-z}Mg_yCa_zA_wPO_4$ coated with the carbonaceous film is preferably in a range of 60 nm to 550 nm and more preferably in a range of 70 nm to 430 nm.

Here, the reason for setting the average primary particle diameter of the primary particles of the electrode active material made of $LiFe_xMn_{1-w-x-y-z}Mg_yCa_zA_wPO_4$ coated with the carbonaceous film in the above-described range is as described below. When the average primary particle diameter is 60 nm or more, there are no cases in which an increase in the specific surface area of carbonaceous electrode active material composite particles increases the mass of required carbon, and thus the charge and discharge capacity is also not decreased. Furthermore, since carbon coating is easy, it is possible to obtain primary particles having a sufficient coating ratio, and a favorable mass energy density can be obtained particularly at a low temperature or during high-speed charge and discharge. On the other hand, when the average primary particle diameter is 550 nm or less, lithium ions or electrons smoothly migrate among the carbonaceous electrode active material composite particles, and thus the internal resistance does not increase, and the output characteristics also do not deteriorate.

The shape of the primary particle of the electrode active material made of $LiFe_xMn_{1-w-x-y-z}Mg_yCa_zA_wPO_4$ coated with the carbonaceous film is not particularly limited, but is preferably a spherical shape since it is easy to generate an electrode material made of spherical particles, particularly, truly spherical particles.

Here, the reason for the shape of the primary particle of the electrode active material being preferably a spherical shape is as described below. It is possible to decrease the amount of a solvent when an electrode material paste for a lithium-ion secondary battery is prepared by mixing the primary particles of the electrode active material coated with the carbonaceous film, a binding agent, and a solvent. Furthermore, it also becomes easy to apply the electrode material paste for a lithium-ion secondary battery to a current collector. In addition, when the shape of the primary particle of the electrode active material is a spherical shape, the surface area of the primary particles of the electrode active material is minimized, furthermore, it is possible to minimize the mixing amount of the binding agent added to the electrode material paste for a lithium-ion secondary battery, and the internal resistance of the obtained electrode can be decreased.

Furthermore, when the shape of the primary particle of the electrode active material is a spherical shape, particularly, a truly spherical shape, it becomes easy to closely pack the primary particles. Therefore, the amount of the electrode material for a lithium-ion secondary battery packed per unit volume increases, and consequently, it is possible to increase the electrode density, and the capacity of the lithium-ion secondary battery can be increased, which is preferable.

The amount of carbon included in the electrode material for a lithium-ion secondary battery of the present embodiment is preferably in a range of 0.5% by mass to 3.5% by mass and more preferably in a range of 0.7% by mass to 2.5% by mass.

Here, the reason for limiting the amount of carbon included in the electrode material for a lithium-ion secondary battery of the present embodiment in the above-described range is as described below. When the amount of carbon is 0.5% by mass or more, the discharge capacity at a high charge-discharge rate is increased in a case in which a battery is formed, and it is possible to realize sufficient charge and discharge rate performance. On the other hand, when the amount of carbon included in the electrode material for a lithium-ion secondary battery is 3.5% by mass or less, the amount of carbon does not become too large, and the battery capacity of a lithium-ion secondary battery per unit mass of the primary particles of the electrode active material is not decreased.

In addition, the ratio of the carbon supporting amount to the specific surface area of the primary particles of the electrode active material ([the carbon supporting amount]/[the specific surface area of the primary particles of the electrode active material]) is preferably in a range of 0.75 to 1.15 and more preferably in a range of 0.8 to 1.1.

Here, the reason for limiting the carbon supporting amount in the electrode material for a lithium-ion secondary battery of the present embodiment in the above-described range is as described below. When the carbon supporting amount is 0.75 or more, the discharge capacity at a high charge-discharge rate is increased in a case in which a battery is formed, and it is possible to realize sufficient charge and discharge rate performance. On the other hand, when the carbon supporting amount is 1.15 or less, the amount of carbon does not become too large, and the battery capacity of a lithium-ion secondary battery per unit mass of the primary particles of the electrode active material is not decreased.

The specific surface area of the electrode material for a lithium-ion secondary battery of the present embodiment is preferably in a range of 7 $m^2/g$ to 18 $m^2/g$ and more preferably in a range of 9 $m^2/g$ to 15 $m^2/g$.

Here, the reason for limiting the specific surface area of the electrode material for a lithium-ion secondary battery of the present embodiment in the above-described range is as described below. When the specific surface area is 7 $m^2/g$ or more, lithium ions or electrons smoothly migrate among the carbonaceous electrode active material composite particles, and thus the internal resistance does not increase, and the output characteristics also do not deteriorate. On the other hand, the specific surface area is 18 $m^2/g$ or less, there are no cases in which an increase in the specific surface area of the carbonaceous electrode active material composite particles increases the mass of required carbon, and thus the charge and discharge capacity is not also decreased.

Electrode Active Material

The electrode active material is made of $LiFe_xMn_{1-w-x-y-z}Mg_yCa_zA_wPO_4$ having a crystal structure preferable for Li diffusion (here, A represents at least one element selected from the group consisting of Co, Ni, Zn, Al, and Ga, $0.05 \leq x \leq 0.35$, $0.01 \leq y \leq 0.10$, $0.0001 \leq z \leq 0.001$, and $0 \leq w \leq 0.02$).

In $LiFe_xMn_{1-w-x-y-z}Mg_yCa_zA_wPO_4$, the reason for x satisfying $0.05 \leq x \leq 0.35$ is as described below. Since Fe develops a charge and discharge capacity at a voltage of near 3.5 V, a decrease in the energy density caused by formation of a solid solution is milder than that of Co or Zn, and thus a relatively large amount of Fe has been set to be available for formation of a solid solution so that an improvement of low-temperature characteristics is expected while the energy density is not excessively decreased. Furthermore, Fe is a carbonization catalyst element and, when forming a Fe solid solution, improves the coating properties of the carbonaceous film and thus enables an improvement of high-speed charge and discharge characteristics or low-temperature characteristics. Therefore, the amount of a solid solution at which a sufficient carbonization catalyst action can be developed has been set as a solid solution range. Particularly, $0.05 \leq x \leq 0.25$ is preferred.

The reason for setting y to satisfy $0.01 \leq y \leq 0.10$ is as described below. Mg is an electrochemical inert element in a voltage range of 1.0 V to 4.3 V, has a strong effect of improving electron conductivity, Li diffusivity, and the activation energy for an intercalation and deintercalation reaction of a lithium ion ($Li^+$), and has a strong effect of improving the energy density. However, when a large amount of Mg forms a solid solution, the charge and discharge capacity and the energy density are significantly decreased, and thus a relatively small amount of Mg at which high-speed charge and discharge characteristics can be sufficiently improved while the energy density is not excessively decreased has been set to be available for formation of a solid solution.

The reason for setting z to satisfy $0.0001 \leq z \leq 0.001$ is as described below.

Ca is an electrochemical inert element in a voltage range of 1.0 V to 4.3 V and is a useful element capable of producing an effect of improving low-temperature characteristics when added in a small amount. However, when a large amount of Ca forms a solid solution, the charge and discharge capacity and the energy density are significantly decreased, and, in a case in which a large amount of Ca is added, Ca is present in a crystal not as a solid solution but as an impurity, and, when dissolved as an impurity during the operation of a battery, the service life characteristics deteriorate. Therefore, a relatively small amount of Ca at which high-speed charge and discharge characteristics can be sufficiently improved while the energy density is not excessively decreased has been set to be available for formation of a solid solution.

The reason for setting w to satisfy $0 \leq w \leq 0.02$ is as described below. Co or Zn is an electrochemical inert element in a voltage range of 1.0 V to 4.3 V, has an effect of improving electron conductivity, Li diffusivity, and the activation energy for an intercalation and deintercalation reaction of a lithium ion (Li$^+$), and has an effect of improving the energy density, and thus Co or Zn can be appropriately added. However, when a large amount of Co or Zn forms a solid solution, the charge and discharge capacity and the energy density are significantly decreased, and thus a relatively small amount of Mg at which high-speed charge and discharge characteristics can be sufficiently improved while the energy density is not excessively decreased has been set to be available for formation of a solid solution.

LiFe$_x$Mn$_{1-w-x-y-z}$Mg$_y$Ca$_z$A$_w$PO$_4$ are particles having an orthorhombic crystal structure and a space group of Pnma.

The mis-fit value $[(1-(b2\times c2)/(b1\times c1))\times 100]$ of a bc plane which is computed from lattice constants b1 and c1 of the LiFe$_x$Mn$_{1-w-x-y-z}$Mg$_y$Ca$_z$A$_w$PO$_4$ and lattice constants b2 and c2 of Fe$_x$Mn$_{1-w-x-y-z}$Mg$_y$Ca$_z$A$_w$PO$_4$ obtained by deintercalating Li from LiFe$_x$Mn$_{1-w-x-y-z}$Mg$_y$Ca$_z$A$_w$PO$_4$ by means of an oxidation treatment using nitrosonium tetrafluoroborate in acetonitrile is 1.32% or more and 1.85% or less and preferably 1.35% or more and 1.82% or less.

Here, the reasons for setting the mis-fit value of the bc plane of LiFe$_x$Mn$_{1-w-x-y-z}$Mg$_y$Ca$_z$A$_w$PO$_4$ in the above-described range are as described below. When the mis-fit value is less than 1.32%, Li is not sufficiently deintercalated and remains in the material. Therefore, in a case in which this material is used for batteries, a sufficient charge and discharge capacity cannot be obtained, and the energy density decreases. On the other hand, when the mis-fit value exceeds 1.85%, the volume change increases in response to charge and discharge, a large amount of activation energy for intercalating and deintercalating Li becomes necessary, and the energy density decreases.

In the electrode material for a lithium-ion secondary battery of the present embodiment, the ratio L/R of a value L of the constant electric current charge capacity of LiFe$_x$Mn$_{1-w-x-y-z}$Mg$_y$Ca$_z$A$_w$PO$_4$ at an electric current density of 3 CA and an upper limit voltage of 4.3 V, which is measured at 25° C., to a value R of the constant electric current charge capacity of LiFe$_x$Mn$_{1-w-x-y-z}$Mg$_y$Ca$_z$A$_w$PO$_4$ at an electric current density of 0.1 CA and an upper limit voltage of 4.3 V, which is measured at 25° C., is preferably 0.55 or more and more preferably 0.57 or more.

Here, the reason for setting the ratio L/R of the value L of the charge capacity to the value R of the charge capacity in the above-described range is as described below. When L/R is equal to or more than 0.55, the charge and discharge capacity at a low temperature does not significantly decrease, and thus a sufficient energy density can be obtained even in a case in which a battery is operated at a high speed.

In the electrode material for a lithium-ion secondary battery of the present embodiment, a Li diffusion coefficient computed from a peak between 3.6 V and 4.2 V of the cyclic voltammetry of LiFe$_x$Mn$_{1-w-x-y-z}$Mg$_y$Ca$_z$A$_w$PO$_4$, which is measured at 25° C., is preferably $1.0\times10^{-12}$ or more and $1.0\times10^{-10}$ or less and more preferably $2.0\times10^{-12}$ or more and $8.0\times10^{-11}$ or less.

Here, the reason for setting the Li diffusion coefficient in the above-described range is as described below. When the Li diffusion coefficient is $1.0\times10^{-12}$ or more, Li diffusion inside the LiFe$_x$Mn$_{1-w-x-y-z}$Mg$_y$Ca$_z$A$_w$PO$_4$ crystals is sufficiently rapid, and a sufficient energy density can be obtained even in a case in which a battery is operated at a high speed. On the other hand, when the Li diffusion coefficient is $1.0\times10^{-10}$ or less, there are no cases in which abnormal electric currents flow due to side reactions caused by batteries being operated at a high speed, and the service life also does not deteriorate.

In the electrode material for a lithium-ion secondary battery of the present embodiment, the value R of the constant electric current charge capacity of LiFe$_x$Mn$_{1-w-x-y-z}$Mg$_y$Ca$_z$A$_w$PO$_4$ at an electric current density of 0.1 CA and an upper limit voltage of 4.3 V, which is measured at 25° C., is preferably 130 mAh/g or more and more preferably 135 mAh/g or more.

Here, the reason for setting the Li charge capacity in the above-described range is as described below. When the charge capacity is 130 mAh/g or more, the high-speed charge capacity becomes sufficient, and the electrode material also becomes suitable for batteries being used at a high speed.

According to the electrode material for a lithium-ion secondary battery of the present embodiment, it is possible to realize a lithium-ion secondary battery having a high mass energy density at a low temperature or during high-speed charge and discharge.

Method for Manufacturing Electrode Material for Lithium-Ion Secondary Battery

A method for manufacturing an electrode material for a lithium-ion secondary battery of the present embodiment is not particularly limited, and examples thereof include a method including a step of synthesizing LiFe$_x$Mn$_{1-w-x-y-z}$Mg$_y$Ca$_z$A$_w$PO$_4$ particles under pressure by heating a raw material slurry α obtained by mixing a Li source, a Fe source, a Mn source, a Mg source, a Ca source, a P source, and an A source with a solvent including water as a main component at a temperature in a range of 150° C. to 250° C. and a step of coating the surfaces of the LiFe$_x$Mn$_{1-w-x-y-z}$Mg$_y$Ca$_z$A$_w$PO$_4$ particles (primary particles) with a carbonaceous film by drying a raw material slurry β obtained by dispersing the LiFe$_x$Mn$_{1-w-x-y-z}$Mg$_y$Ca$_z$A$_w$PO$_4$ particles in a water solvent including a carbon source so as to granulate the slurry and then heating the slurry at a temperature in a range of 500° C. to 860° C.

A method for synthesizing the LiFe$_x$Mn$_{1-w-x-y-z}$Mg$_y$Ca$_z$A$_w$PO$_4$ particles is not particularly limited and, for example, a Li source, a Fe source, a Mn source, a Mg source, a Ca source, a P source, and an A (at least one element selected from the group consisting of Co, Ni, Zn, Al, and Ga) source are injected into a solvent including water as a main component and stirred, thereby preparing the raw material slurry α including a raw material of LiFe$_x$Mn$_{1-w-x-y-z}$Mg$_y$Ca$_z$A$_w$PO$_4$ particles.

The Li source, the Fe source, the Mn source, the Mg source, the Ca source, the P source, and the A source are injected into the solvent including water as a main component so that the molar ratio therebetween (Li source:Fe source:Mn source:Mg source:Ca source:P source:A source), that is, the molar ratio of Li:Fe:Mn:Mg:Ca:P:A reaches 2 to 3.5:0.05 to 0.35:0.94 to 0.55:0.01 to 0.10:0.00001 to 0.001: 0.95 to 1.10:0 to 0.05, the sources are stirred and mixed together, thereby preparing the raw material slurry α.

In order to uniformly mix the Li source, the Fe source, the Mn source, the Mg source, the Ca source, the P source, and the A source together, it is preferable to respectively put the Li source, the Fe source, the Mn source, the Mg source, the Ca source, the P source, and the A source into an aqueous solution state temporarily and then mix the sources together.

The molar concentration of the Li source, the Fe source, the Mn source, the Mg source, the Ca source, the P source, and the A source in the raw material slurry α is preferably in a range of 0.8 mol/L to 3.5 mol/L since it is necessary to obtain highly pure, highly crystalline, and extremely fine $LiFe_xMn_{1-w-x-y-z}Mg_yCa_zA_wPO_4$ particles.

Examples of the Li source include hydroxides such as lithium hydroxide (LiOH), inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), and lithium dihydrogen phosphate ($LiH_2PO_4$), organic lithium acid salts such as lithium acetate ($LICH_3COO$) and lithium oxalate (($COOLi)_2$), and hydrates thereof. As the Li source, at least one compound selected from the above-described group is preferably used.

Meanwhile, lithium phosphate ($Li_3PO_4$) can also be used as the Li source and the P source.

As the Fe source, iron compounds such as iron (II) chloride ($FeCl_2$), iron (II) sulfate ($FeSO_4$), and iron (II) acetate ($Fe(CH_3COO)_2$) or hydrates thereof, trivalent iron compounds such as iron (III) nitrate ($Fe(NO_3)_3$), iron (III) chloride ($FeCl_3$), and iron (III) citrate ($FeC_6H_5O_7$), lithium iron phosphate, or the like can be used.

The Mn source is preferably a Mn salt, and examples thereof include manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof. As the Mn source, at least one compound selected from the above-described group is preferably used.

A Mg source is preferably a Mg salt, and examples thereof include magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof. As the Mg source, at least one compound selected from the above-described group is preferably used.

The Ca source is preferably a Ca salt, and examples thereof include calcium (II) hydroxide ($Ca(OH)_2$), calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof. As the Ca source, at least one compound selected from the above-described group is preferably used.

As the P source, for example, at least one compound selected from phosphoric acids such as orthophosphonic acid ($H_3PO_4$) and metaphosphoric acid ($HPO_3$), phosphoric salts such as ammonium dihydrogen phosphate ($NH_4H_2PO_4$), diammonium phosphate (($NH_4)_2HPO_4$), ammonium phosphate (($NH_4)_3PO_4$), lithium phosphate ($Li_3PO_4$), lithium hydrogen phosphate ($LI_2HPO_4$), and lithium dihydrogen phosphate ($LiH_2PO_4$), and hydrates thereof is preferably used.

A Co source is preferably a Co salt, and examples thereof include cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof. As the Co source, at least one compound selected from the above-described group is preferably used.

A Ni source is preferably, for example, a Ni salt, and examples thereof include nickel (II) chloride ($NiCl_2$), nickel (II) sulfate ($NiSO_4$), nickel (II) nitrate ($Ni(NO_3)_2$), nickel (II) acetate ($Ni(CH_3COO)_2$), and hydrates thereof. As the Ni source, at least one compound selected from the group consisting of the above-described compounds is preferably used.

A Zn source is preferably a Zn salt, and examples thereof include zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof. As the Zn source, at least one compound selected from the group consisting of the above-described compounds is preferably used.

Examples of an Al source include aluminum compounds such as chlorides, sulfoxides, nitroxides, acetoxides, and hydroxides, and at least one compound selected from the group consisting of the above-described compounds is preferably used.

Examples of a Ga source include gallium compounds such as chlorides, sulfoxides, nitroxides, acetoxides, and hydroxides, and at least one compound selected from the group consisting of the above-described compounds is preferably used.

The solvent including water as a main component is anyone of water and water-based solvents which include water as a main component and include an aqueous solvent such as an alcohol as necessary.

The aqueous solvent is not particularly limited as long as the solvent is capable of dissolving the Li source, the Fe source, the Mn source, the Mg source, the P source, and the A source. Examples thereof include alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These aqueous solvents may be singly used or in a mixture form of two or more aqueous solvents.

Next, the raw material slurry α is put into a pressure-resistant container, is heated at a temperature in a range of 150° C. to 250° C., preferably, in a range of 165° C. to 215° C., and is hydrothermally treated for 0.5 hours to 60 hours, thereby obtaining $LiFe_xMn_{1-w-x-y-z}Mg_yCa_zA_wPO_4$ particles.

When raw material slurry reaches the temperature in a range of 150° C. to 250° C., the pressure in the pressure-resistant container reaches, for example, 0.1 MPa to 2 MPa.

In this case, it is possible to control the particle diameters of the $LiFe_xMn_{1-w-x-y-z}Mg_yCa_zA_wPO_4$ particles to be a desired size by adjusting the temperature and the duration during the hydrothermal treatment.

Next, the $LiFe_xMn_{1-w-x-y-z}Mg_yCa_zA_wPO_4$ particles are dispersed in the water solvent including a carbon source, thereby preparing a raw material slurry β.

Next, the raw material slurry β is dried and granulated, then, is heated at a temperature in a range of 500° C. to 860° C. for 0.5 hours to 60 hours, and the surfaces of the $LiFe_xMn_{1-w-x-y-z}Mg_yCa_zA_wPO_4$ particles (primary particles) with a carbonaceous film, thereby obtaining a cathode material for a lithium-ion secondary battery of the present embodiment.

The carbon source is not particularly limited, and for example, a natural water-soluble polymer such as gelatin, casein, collagen, hyaluronic acid, albumin, or starch, a semisynthetic polymer such as methyl cellulose, ethyl cellulose, methyl hydroxypropyl cellulose, carboxymethyl cellulose, hydroxymethyl cellulose, hydroxypropyl cellulose, carboxymethyl cellulose sodium, or propylene glycol alginate, a synthetic polymer such as polyvinyl alcohol, polyvinylpyrrolidone, a carbomer (carboxyvinyl polymer), polyacrylate, or polyethylene oxide, or the like can be used.

These carbon sources may be used singly or in a mixture form of two or more carbon sources.

In the method for manufacturing an electrode material for a lithium-ion secondary battery of the present embodiment, when the total mass of the electrode active material and the carbon source is set to 100% by mass, the additive amount (additive rate) of the carbon source is preferably in a range of 1% by mass to 15% by mass and more preferably in a range of 2% by mass to 12% by mass.

When the additive amount of the carbon source is 1% by mass or more, mixing stability in the electrode material for a lithium-ion secondary battery can be obtained. On the other hand, when the additive amount of the carbon source is 15% by mass or less, the content of a cathode active material is relatively great, and thus battery characteristics do not degrade.

Chemical Li Deintercalation

The electrode material for a lithium-ion secondary battery obtained as described above is mixed with a solution obtained by adding an oxidant to acetonitrile and is stirred for 1 hour to 48 hours, thereby chemically deintercalating Li.

As the oxidant, for example, nitrosonium tetrafluoroborate is preferably used.

The additive amount of the oxidant is set to an amount that is approximately 1.1 times the amount of Li deintercalated.

After the Li deintercation treatment, solid and liquid are separated from each other by means of filtration, the electrode material is cleaned with acetone and then is dried in a vacuum dryer at a temperature in a range of 25° C. to 70° C. for one hour to 48 hours.

By means of the above-described treatment, Li is chemically deintercalated from $LiFe_xMn_{1-w-x-y-z}Mg_yCa_zA_wPO_4$, and $Fe_xMn_{1-w-x-y-z}Mg_yCa_zA_wPO_4$ can be obtained.

According to the method for manufacturing an electrode material for a lithium-ion secondary battery of the present embodiment, it is possible to obtain a lithium-ion secondary battery having a high mass energy density at a low temperature or during high-speed charge and discharge.

Electrode for Lithium-ion Secondary Battery

An electrode for a lithium-ion secondary battery of the present embodiment includes an electrode current collector and an electrode mixture layer (electrode) formed on the electrode current collector, and the electrode mixture layer includes the electrode material for a lithium-ion secondary battery of the present embodiment.

That is, the electrode for a lithium-ion secondary battery of the present embodiment is obtained by forming the electrode mixture layer formed on one main surface of the electrode current collector using the electrode material for a lithium-ion secondary battery of the present embodiment.

The electrode for a lithium-ion secondary battery of the present embodiment is mainly used as a cathode for a lithium-ion secondary battery.

A method for manufacturing an electrode for a lithium-ion secondary battery of the present embodiment is not particularly limited as long as an electrode can be formed on one main surface of an electrode current collector using the electrode material for a lithium-ion secondary battery of the present embodiment. Examples of the method for manufacturing an electrode for a lithium-ion secondary battery of the present embodiment include the following method.

First, an electrode material paste for a lithium-ion secondary battery is prepared by mixing the electrode material for a lithium-ion secondary battery of the present embodiment, a binding agent, a conductive auxiliary agent, and a solvent.

Binding Agent

The binding agent is not particularly limited as long as the binding agent can be used in a water system. As the binding agent, for example, at least one selected from the group of polyethylene, polypropylene, polyethylene terephthalate, polymethyl methacrylate, vinyl acetate copolymers, styrene/butadiene-based latexes, acrylic latexes, acrylonitrile/butadiene-based latexes, fluorine-based latexes, silicon-based latexes is used.

When the total mass of the electrode material for a lithium-ion secondary battery of the present embodiment, the binding agent, and the conductive auxiliary agent is set to 100% by mass, the content ratio of the binding agent to the electrode material paste for a lithium-ion secondary battery is preferably in a range of 1 part by mass to 10 parts by mass and more preferably in a range of 2 parts by mass to 6 parts by mass.

Conductive Auxiliary Agent

The conductive auxiliary agent is not particularly limited, and, for example, at least one conductive auxiliary agent selected from the group of fibrous carbon such as acetylene black, Ketjen black, furnace black, vapor grown carbon fiber (VGCF), and carbon nanotube is used.

When the total mass of the electrode material for a lithium-ion secondary battery of the present embodiment, the binding agent, and the conductive auxiliary agent is set to 100% by mass, the content ratio of the conductive auxiliary agent to the electrode material paste for a lithium-ion secondary battery is preferably in a range of 1 part by mass to 15 parts by mass and more preferably in a range of 3 parts by mass to 10 parts by mass.

Solvent

To the electrode material paste for a lithium-ion secondary battery including the cathode material for a lithium-ion secondary battery of the present embodiment, a solvent may be appropriately added in order to facilitate coating of an article to be coated such as a current collector.

A main solvent is water, but the electrode material paste may include a water-based solvent such as an alcohol, a glycol, or an ether as long as the characteristics of the cathode material for a lithium-ion secondary battery of the present embodiment are not lost.

When the total mass of the electrode material for a lithium-ion secondary battery of the present embodiment, the binding agent, the conductive auxiliary agent, and the solvent is set to 100% by mass, the content ratio of the solvent to the electrode material paste for a lithium-ion secondary battery is preferably in a range of 80 parts by mass to 300 parts by mass and more preferably in a range of 100 parts by mass to 250 parts by mass.

When the solvent is included in the above-described range, it is possible to obtain an electrode material paste for a lithium-ion secondary battery having excellent electrode formability and excellent battery characteristics.

A method for mixing the cathode material for a lithium-ion secondary battery of the present embodiment, the binding agent, the conductive auxiliary agent, and the solvent is not particularly limited as long as it is possible to uniformly mix the above-described components. Examples thereof include methods in which a kneader such as a ball mill, a sand mill, a planetary mixer, a paint shaker, or a homogenizer is used.

Next, the electrode material paste for a lithium-ion secondary battery is applied to one main surface of the electrode current collector so as to form a coating, and the coating is dried and then pressed under pressure, whereby it is possible to obtain an electrode for a lithium-ion secondary battery including the electrode mixture layer formed on one main surface of the electrode current collector.

Lithium-Ion Secondary Battery

A lithium-ion secondary battery of the present embodiment includes the electrode for a lithium-ion secondary battery of the present embodiment (cathode), an anode, a separator, and an electrolytic solution.

In the lithium-ion secondary battery of the present embodiment, the anode, the electrolyte, the separator, and the like are not particularly limited.

As the anode, for example, an anode material such as metallic Li, a carbon material, a Li alloy, or $Li_4Ti_5O_{12}$ is used.

In addition, a solid electrolyte may be used instead of the electrolyte and the separator.

The electrolyte can be produced by mixing ethylene carbonate (EC) and ethyl methyl carbonate (EMC) so that the volume ratio therebetween reaches 1:1 and dissolving lithium hexafluorophosphate ($LiPF_6$) in the obtained solvent mixture so that the concentration thereof reaches, for example, 1 mol/dm$^3$.

As the separator, it is possible to use, for example, porous propylene.

In the lithium-ion secondary battery of the present embodiment, since the electrode for a lithium-ion secondary battery of the present embodiment is used as the cathode, and thus the lithium-ion secondary battery has a high capacity and a high energy density.

As described above, according to the electrode material for a lithium-ion secondary battery of the present embodiment, since electron conductivity and ion conductivity improves, it is possible to realize a lithium-ion secondary battery having a high mass energy density at a low temperature or during high-speed charge and discharge.

EXAMPLES

Hereinafter, the present invention will be more specifically described using examples and comparative examples, but the present invention is not limited to the following examples.

Example 1

Synthesis of Electrode Material for Lithium-ion Secondary Battery $LiFe_{0.1898}Mn_{0.80}Mg_{0.01}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source were mixed together so that the molar ratio therebetween reached Li:Fe:Mn:Mg:Ca:P=3:0.1898:0.80:0.01:0.0002:1, thereby preparing 250 ml of a raw material slurry α.

Next, this raw material slurry α was put into a pressure resistant vessel.

After that, hydrothermal synthesis was carried out by performing a heating reaction on the raw material slurry α at 185° C. for 16 hours.

After the reaction, the atmosphere in the pressure resistant vessel was cooled to room temperature, thereby obtaining a cake-state precipitate of a reaction product.

This precipitate was sufficiently washed with distilled water a plurality of times, and the water content ratio thereof was maintained at 40% so as to prevent the precipitate from being dried, thereby producing a cake-form substance.

This cake-form substance was dried in a vacuum at 70° C. for two hours, raw material slurry β obtained by dispersing 2% by mass of polyvinyl alcohol adjusted in advance to be 10% by mass relative to 95% by mass of the obtained powder (particles) in a water solvent was dried and granulated, and then a thermal treatment was carried out at 740° C. for four hours. Therefore, the surfaces of the particles were coated with a carbonaceous film, and an electrode material for a lithium-ion secondary battery of Example 1 was obtained.

Example 2

Synthesis of Electrode Material for Lithium-ion Secondary Battery $LiFe_{0.1848}Mn_{0.80}Mg_{0.01}Ca_{0.0002}Co_{0.005}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, an aqueous solution of $Ca(OH)_2$ as a Ca source, and an aqueous solution of $CoSO_4$ as a Co source were mixed together so that the molar ratio therebetween reached Li:Fe:Mn:Mg:Ca:Co:P=3:0.1848:0.80:0.01:0.0002:0.005:1, thereby preparing 250 ml of a raw material slurry α.

Hereinafter, an electrode material for a lithium-ion secondary battery of Example 2 was obtained in the same manner as in Example 1.

Example 3

Synthesis of Electrode Material for Lithium-ion Secondary Battery $LiFe_{0.1448}Mn_{0.80}Mg_{0.05}Ca_{0.0002}Co_{0.005}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, an aqueous solution of $Ca(OH)_2$ as a Ca source, and an aqueous solution of $CoSO_4$ as a Co source were mixed together so that the molar ratio therebetween reached Li:Fe:Mn:Mg:Ca:Co:P=3:0.1448:0.80:0.05:0.0002:0.005:1, thereby preparing 250 ml of a raw material slurry α.

Hereinafter, an electrode material for a lithium-ion secondary battery of Example 3 was obtained in the same manner as in Example 1.

Example 4

Synthesis of Electrode Material for Lithium-ion Secondary Battery $LiFe_{0.2848}Mn_{0.70}Mg_{0.01}Ca_{0.0002}Co_{0.005}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, an aqueous solution of $Ca(OH)_2$ as a Ca source, and an aqueous solution of $CoSO_4$ as a Co source were mixed together so that the molar ratio therebetween reached Li:Fe:Mn:Mg:Ca:Co:P=3:0.2848:0.70:0.01:0.0002:0.005:1, thereby preparing 250 ml of a raw material slurry α.

Hereinafter, an electrode material for a lithium-ion secondary battery of Example 4 was obtained in the same manner as in Example 1.

Example 5

Synthesis of Electrode Material for Lithium-ion Secondary Battery $LiFe_{0.2498}Mn_{0.70}Mg_{0.05}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source were mixed together so that the molar ratio therebetween reached Li:Fe:Mn:Mg:Ca:P=3:0.2498:0.70:0.05:0.0002:1, thereby preparing 250 ml of a raw material slurry α.

Hereinafter, an electrode material for a lithium-ion secondary battery of Example 5 was obtained in the same manner as in Example 1.

Example 6

Synthesis of Electrode Material for Lithium-ion Secondary Battery $LiFe_{0.2448}Mn_{0.70}Mg_{0.05}Ca_{0.0002}Co_{0.005}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, an aqueous solution of $Ca(OH)_2$ as a Ca source, and an aqueous solution of $CoSO_4$ as a Co source were mixed together so that the molar ratio therebetween reached Li:Fe:Mn:Mg:Ca:Co:P=3:0.2448:0.70:0.05:0.0002:0.005:1, thereby preparing 250 ml of a raw material slurry α.

Hereinafter, an electrode material for a lithium-ion secondary battery of Example 6 was obtained in the same manner as in Example 1.

Comparative Example 1

Synthesis of Electrode Material for Lithium-ion Secondary Battery $LiFe_{0.20}Mn_{0.80}PO_4$ was synthesized in the following manner.

$Li_3PO_4$ as a Li source and a P source, an aqueous solution of $FeSO_4$ as a Fe source, and an aqueous solution of $MnSO_4$ as a Mn source, were mixed together so that the molar ratio therebetween reached Li:Fe:Mn:P=3:0.20:0.80:1, thereby preparing 250 ml of a raw material slurry α.

Hereinafter, an electrode material for a lithium-ion secondary battery of Comparative Example 1 was obtained in the same manner as in Example 1.

Comparative Example 2

Synthesis of Electrode Material for Lithium-ion Secondary Battery $LiFe_{0.19}Mn_{0.80}Mg_{0.01}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $MgSO_4$ as a Mg source were mixed together so that the molar ratio therebetween reached Li:Fe:Mn:Mg:P=3:0.19:0.80:0.01:1, thereby preparing 250 ml of a raw material slurry α.

Hereinafter, an electrode material for a lithium-ion secondary battery of Comparative Example 2 was obtained in the same manner as in Example 1.

Comparative Example 3

Synthesis of Electrode Material for Lithium-ion Secondary Battery $LiFe_{0.0798}Mn_{0.80}Mg_{0.12}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source were mixed together so that the molar ratio therebetween reached Li:Fe:Mn:Mg:Ca:P=3:0.0798:0.80:0.12:0.0002:1, thereby preparing 250 ml of a raw material slurry α.

Hereinafter, an electrode material for a lithium-ion secondary battery of Comparative Example 3 was obtained in the same manner as in Example 1.

Comparative Example 4

Synthesis of Electrode Material for Lithium-ion Secondary Battery $LiFe_{0.1998}Mn_{0.80}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $Ca(OH)_2$ as a Ca source were mixed together so that the molar ratio therebetween reached Li:Fe:Mn:Ca:P=3:0.1998:0.80:0.0002:1, thereby preparing 250 ml of a raw material slurry α.

Hereinafter, an electrode material for a lithium-ion secondary battery of Comparative Example 4 was obtained in the same manner as in Example 1.

Comparative Example 5

Synthesis of Electrode Material for Lithium-ion Secondary Battery $LiFe_{0.30}Mn_{0.70}PO_4$ was synthesized in the following manner.

$Li_3PO_4$ as a Li source and a P source, an aqueous solution of $FeSO_4$ as a Fe source, and an aqueous solution of $MnSO_4$ as a Mn source were mixed together so that the molar ratio therebetween reached Li:Fe:Mn:P=3:0.30:0.70:1, thereby preparing 250 ml of a raw material slurry α.

Hereinafter, an electrode material for a lithium-ion secondary battery of Comparative Example 5 was obtained in the same manner as in Example 1.

Comparative Example 6

Synthesis of Electrode Material for Lithium-ion Secondary Battery $LiFe_{0.29}Mn_{0.70}Mg_{0.01}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $MgSO_4$ as a Mg source were mixed together so that the molar ratio therebetween reached Li:Fe:Mn:Ca:P=3:0.29:0.70:0.01:1, thereby preparing 250 ml of a raw material slurry α.

Hereinafter, an electrode material for a lithium-ion secondary battery of Comparative Example 6 was obtained in the same manner as in Example 1.

Comparative Example 7

Synthesis of Electrode Material for Lithium-ion Secondary Battery $LiFe_{0.1798}Mn_{0.70}Mg_{0.12}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source were mixed together so that the molar ratio therebetween reached Li:Fe:Mn:Mg:Ca:P=3:0.1798:0.70:0.12:0.0002:1, thereby preparing 250 ml of a raw material slurry α.

Hereinafter, an electrode material for a lithium-ion secondary battery of Comparative Example 7 was obtained in the same manner as in Example 1.

Comparative Example 8

Synthesis of Electrode Material for Lithium-ion Secondary Battery $LiFe_{0.2998}Mn_{0.70}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $Ca(OH)_2$ as a Ca source were mixed together so that the molar ratio therebetween reached Li:Fe:Mn:Ca:P=3:0.2998:0.70:0.0002:1, thereby preparing 250 ml of a raw material slurry α.

Hereinafter, an electrode material for a lithium-ion secondary battery of Comparative Example 8 was obtained in the same manner as in Example 1.

Evaluation of Electrode Materials for Lithium-Ion Secondary Battery (1) Amount of Carbon The amount of carbon in the electrode material for a lithium-ion secondary battery of each of the examples and the comparative examples was measured using a carbon analyzer (trade name: EMIA-220V, manufactured by Horiba Ltd.). The results are shown in Table 1.

(2) Specific Surface Area

The specific surface area of the electrode material for a lithium-ion secondary battery of each of the examples and the comparative examples was measured using a specific surface area meter (trade name: BELSORP-mini, manufactured by MicrotracBEL Corp.) by means of a BET method in which nitrogen ($N_2$) adsorption was used. The results are shown in Table 1.

(3) Average Primary Particle Diameter

The electrode material for a lithium-ion secondary battery was observed using a scanning electron microscope (SEM) (trade name: S-4800, manufactured by Hitachi High-Technologies Corporation), and the average primary particle diameter of the electrode material for a lithium-ion secondary battery of each of the examples and the comparative examples was obtained from the obtained scanning electron microscopic image. The evaluation results are shown in Table 1.

Chemical Li Deintercalation

The electrode material for a lithium-ion secondary battery of each of the examples and the comparative examples was mixed with a solution obtained by adding $NOBF_4$ as an oxidant to acetonitrile, and the components were stirred together for 15 hours, thereby chemically deintercalating Li.

The additive amount of $NOBF_4$ was set to an amount that was approximately 1.1 times the amount of Li deintercalated.

After the Li deintercalation treatment, solid and liquid were separated from each other by means of filtration, the electrode material was cleaned with acetone and then was dried in a vacuum dryer at a temperature of 50° C. for 24 hours, thereby producing a sample.

Evaluation of Electrode Materials for Lithium-Ion Secondary Battery and Electrode Materials from which Li is Chemically Deintercalated (1) X-ray Diffraction The electrode material for a lithium-ion secondary battery of each of the examples and the comparative examples was identified using an X-ray diffraction apparatus (trade name: X'Pert PRO MPS, manufactured by PANalytical, radiation source: CuKα).

As a result, in the electrode material for a lithium-ion secondary battery of Example 1, it was confirmed that single-phase $LiFe_{0.1898}Mn_{0.80}Mg_{0.01}Ca_{0.0002}PO_4$ was generated. In addition, in the electrode material for a lithium-ion secondary battery of Example 2, it was confirmed that single-phase $LiFe_{0.1848}Mn_{0.80}Mg_{0.01}Ca_{0.0002}Co_{0.005}PO_4$ was generated. In addition, in the electrode material for a lithium-ion secondary battery of Comparative Example 1, it was confirmed that single-phase $LiFe_{0.20}Mn_{0.80}PO_4$ was generated. In addition, in the electrode material for a lithium-ion secondary battery of Comparative Example 2, it was confirmed that single-phase $LiFe_{0.19}Mn_{0.80}Mg_{0.01}PO_4$ was generated. In addition, in the electrode material for a lithium-ion secondary battery of Comparative Example 3, it was confirmed that single-phase $LiFe_{0.0798}Mn_{0.80}Mg_{0.12}Ca_{0.0002}PO_4$ was generated. In addition, in the electrode material for a lithium-ion secondary battery of Comparative Example 4, it was confirmed that single-phase $LiFe_{0.1998}Mn_{0.80}Ca_{0.0002}PO_4$ was generated.

In addition, the crystal lattice constants and the lattice volumes were computed from the X-ray diffraction patterns of these electrode materials for a lithium-ion secondary battery. The results are shown in Table 1.

(2) Evaluation of Electrode Materials from which Li is Chemically Deintercalated The electrode material for a lithium-ion secondary battery of each of the examples and the comparative examples from which Li was chemically deintercalated was evaluated using an X-ray diffraction apparatus (trade name: X'Pert PRO MPS, manufactured by PANalytical, radiation source: CuKα). In addition, the crystal lattice constants and the lattice volumes were computed from the X-ray diffraction patterns of these electrode materials for a lithium-ion secondary battery. The results are shown in Table 1.

Production of Lithium-ion Secondary Battery

The electrode material for a lithium-ion secondary battery of each of the examples and the comparative examples, polyvinylidene fluoride (PVdF) as a binding agent, and acetylene black (AB) as a conductive auxiliary agent were added to N-methyl-2-pyrrolidone (NMP) which was a solvent so that the mass ratio therebetween in a paste reached electrode material:AB:PVdF=90:5:5, and the components were mixed together, thereby preparing an electrode material paste for a lithium-ion secondary battery.

Next, the electrode material paste for a lithium-ion secondary battery was applied to a surface of a 30 μm-thick aluminum foil (current collector) so as to form a coating, and the coating was dried, thereby forming an electrode mixture layer on the surface of the aluminum foil. After that, the electrode mixture layer was pressed under a predetermined pressure so as to obtain a predetermined density, thereby producing a cathode for a lithium-ion secondary battery of each of the examples and the comparative examples.

Next, a circular plate having a diameter of 16 mm was produced from the cathode for a lithium-ion secondary battery using a shaping machine by means of punching, was dried in a vacuum, and then a lithium-ion secondary battery of each of the examples and the comparative examples was produced using a stainless steel (SUS) 2016 coil cell in a dried argon atmosphere.

Metallic lithium was used as an anode, a porous polypropylene film was used as a separator, and a $LiPF_6$ solution (1 M) was used as an electrolyte. As the $LiPF_6$ solution, a solution obtained by mixing ethylene carbonate and ethyl methyl carbonate so that the volume ratio therebetween reached 1:1 was used.

Evaluation of Lithium-ion Secondary Batteries (1) Battery Characteristics

The battery characteristics of the lithium-ion secondary batteries were evaluated. At an environmental temperature of 25° C., constant electric current charge was carried out at an electric current value of 0.1 CA until the voltage of the cathode reached 4.3 V relative to the equilibrium voltage of Li, and, once the voltage reached 4.3 V, constant voltage charge was carried out until the electric current value reached 0.01 CA. The charge capacity obtained at an electric current value of 0.1 CA during the charge was considered as R.

After that, the lithium-ion secondary battery was rested for one minute, and then constant electric current discharge was carried out at 0.1 CA until the voltage of the cathode reached 2.0 V relative to the equilibrium voltage of Li at an environmental temperature of 25° C. After that, at an environmental temperature of 25° C., constant electric current charge was carried out at an electric current value of 3 CA until the voltage of the cathode reached 4.3 V relative to the equilibrium voltage of Li. The charge capacity obtained by means of constant electric current charge at an electric current value of 3 CA was considered as L. When an electrode material in which a change in the lattice volume is suppressed which can be obtained in the present examples is used, it is possible to ensure a sufficient charge capacity from charge at an electric current value of 3 CA and suppress the following decrease in both the discharge capacity and the discharge voltage. As a result, it becomes possible to suppress a decrease in the mass energy density. The results are shown in Table 1.

(2) Li Diffusion Coefficient in Mn Region During Charge

The cyclic voltammetry of the lithium-ion secondary battery was measured using an electrochemical measurement system (product name: HZ-3000, manufactured by Hokuto Denko Corp.).

The cyclic voltammetry were measured in a voltage range of 2.0 to 5.0 V at each voltage scanning rate of 5, 3, 1, and 0.5 mV/sec. The cyclic voltammetry were measured in the following order. In the beginning of the measurement, for the purpose of aging of the battery, the first cycle was performed in an order of the charge side and the discharge side at an initial voltage of an open-circuit voltage and a voltage scanning rate of 5 mV/sec. In the subsequent cycles, the initial voltage was set to 2.0 V, and the cyclic voltammetry was measured in an order of the charge side and the discharge side at 5, 3, 1, and 0.5 mV/sec. The charge-side peaks of individual voltage scanning rates obtained from this measurement in a range of 3.6 V to 4.2 V was considered as electric current peaks derived from reactions in the Mn region during charge. The Li diffusion coefficient in the Mn region during charge was computed using an expression obtained by solving the following Randles-Sevcik expression (Expression (1) below) with respect to the diffusion coefficient from the slops obtained by plotting the values of the electric current peaks and the root of the voltage scanning rates. The evaluation results are shown in Table 1.

$$Ip = 0.4463 n3/2 F3/2 CLiSR{-1/2} T{-1/2} DLi1/2 v1/2 \quad (1)$$

(Ip: peak electric current [A], n: number of charges moved, F: Faraday constant, CLi: molar concentration [mol/cm$^3$], S: electrode area [cm$^2$], R: gas constant, T: absolute temperature [K], DLi: Li diffusion coefficient [cm$^2$/sec], v: voltage scanning rate [V/s])

TABLE 1

| Sample | | Specific surface area [m$^2$/g] | Amount of C [Wt. %] | Lattice constant before treatment [angstrom] | | | Lattice constant after Li deintercalation treatment [angstrom] | |
|---|---|---|---|---|---|---|---|---|
| | | | | a1 | b1 | c1 | a2 | b2 |
| Example 1 | $LiFe_{0.1898}Mn_{0.80}Mg_{0.01}Ca_{0.0002}PO_4$ | 11.6 | 1.03 | 10.388 | 6.056 | 4.724 | 9.692 | 5.881 |
| Example 2 | $LiFe_{0.1848}Mn_{0.80}Mg_{0.01}Ca_{0.0002}Co_{0.005}PO_4$ | 12.3 | 1.11 | 10.386 | 6.055 | 4.723 | 9.693 | 5.881 |
| Example 3 | $LiFe_{0.1448}Mn_{0.80}Mg_{0.05}Ca_{0.0002}Co_{0.005}PO_4$ | 12.1 | 1.08 | 10.387 | 6.058 | 4.724 | 9.696 | 5.892 |
| Example 4 | $LiFe_{0.2848}Mn_{0.70}Mg_{0.01}Ca_{0.0002}Co_{0.005}PO_4$ | 11.9 | 1.03 | 10.386 | 6.057 | 4.725 | 9.689 | 5.887 |
| Example 5 | $LiFe_{0.2498}Mn_{0.70}Mg_{0.05}Ca_{0.0002}PO_4$ | 12.4 | 1.05 | 10.384 | 6.057 | 4.725 | 9.707 | 5.893 |
| Example 6 | $LiFe_{0.2448}Mn_{0.70}Mg_{0.05}Ca_{0.0002}Co_{0.005}PO_4$ | 12.8 | 1.09 | 10.385 | 6.059 | 4.723 | 9.712 | 5.899 |
| Comparative Example 1 | $LiFe_{0.2}Mn_{0.8}PO_4$ | 13.1 | 1.12 | 10.414 | 6.072 | 4.727 | 9.680 | 5.901 |
| Comparative Example 2 | $LiFe_{0.19}Mn_{0.80}Mg_{0.01}PO_4$ | 12.4 | 1.07 | 10.390 | 6.057 | 4.724 | 9.696 | 5.876 |
| Comparative Example 3 | $LiFe_{0.0798}Mn_{0.80}Mg_{0.12}Ca_{0.0002}PO_4$ | 11.7 | 1.06 | 10.293 | 5.923 | 4.711 | 9.684 | 5.794 |
| Comparative Example 4 | $LiFe_{0.1998}Mn_{0.80}Ca_{0.0002}PO_4$ | 12.6 | 1.11 | 10.392 | 6.056 | 4.725 | 9.694 | 5.880 |
| Comparative Example 5 | $LiFe_{0.3}Mn_{0.7}PO_4$ | 12.2 | 1.07 | 10.397 | 6.059 | 4.725 | 9.691 | 5.879 |
| Comparative Example 6 | $LiFe_{0.29}Mn_{0.70}Mg_{0.01}PO_4$ | 13.1 | 1.14 | 10.394 | 6.058 | 4.725 | 9.690 | 5.881 |
| Comparative Example 7 | $LiFe_{0.1798}Mn_{0.70}Mg_{0.12}Ca_{0.0002}PO_4$ | 12.5 | 1.09 | 10.261 | 5.921 | 4.717 | 9.676 | 5.807 |
| Comparative Example 8 | $LiFe_{0.2998}Mn_{0.70}Ca_{0.0002}PO_4$ | 11.8 | 1.07 | 10.389 | 6.054 | 4.723 | 9.694 | 5.874 |

TABLE 1-continued

|  | Lattice constant after Li deintercalation treatment [angstrom] c2 | bc plane mis-fit (%) | Constant electric current capacity [mAh/g] 0.1 CA | Constant electric current capacity [mAh/g] 3 CA | 3 CA/0.1 CA constant electric current capacity ratio | Li diffusion coefficient during charge [cm²/sec] |
|---|---|---|---|---|---|---|
| Example 1 | 4.776 | 1.82 | 140.2 | 82.1 | 0.586 | $2.9 \times 10^{-12}$ |
| Example 2 | 4.778 | 1.74 | 143.7 | 82.6 | 0.575 | $6.9 \times 10^{-12}$ |
| Example 3 | 4.778 | 1.63 | 149.8 | 89.4 | 0.597 | $1.3 \times 10^{-11}$ |
| Example 4 | 4.778 | 1.72 | 145.6 | 86.2 | 0.592 | $7.4 \times 10^{-11}$ |
| Example 5 | 4.777 | 1.64 | 152.4 | 97.2 | 0.638 | $2.1 \times 10^{-11}$ |
| Example 6 | 4.777 | 1.53 | 156.2 | 113.5 | 0.727 | $5.3 \times 10^{-11}$ |
| Comparative Exanple 1 | 4.767 | 1.99 | 136.1 | 67.5 | 0.496 | $8.2 \times 10^{-13}$ |
| Comparative Example 2 | 4.775 | 1.94 | 139.2 | 71.3 | 0.512 | $6.4 \times 10^{-13}$ |
| Comparative Example 3 | 4.754 | 1.29 | 133.4 | 69.6 | 0.522 | $8.2 \times 10^{-10}$ |
| Comparative Example 4 | 4.774 | 1.90 | 138.0 | 63.5 | 0.460 | $3.6 \times 10^{-13}$ |
| Comparative Example 5 | 4.775 | 1.95 | 142.3 | 74.3 | 0.522 | $7.3 \times 10^{-13}$ |
| Comparative Example 6 | 4.776 | 1.87 | 143.9 | 77.3 | 0.537 | $8.5 \times 10^{-13}$ |
| Comparative Example 7 | 4.753 | 1.18 | 135.2 | 70.2 | 0.519 | $9.5 \times 10^{-10}$ |
| Comparative Example 8 | 4.776 | 1.88 | 141.8 | 76.4 | 0.539 | $7.1 \times 10^{-13}$ |

From the results of Table 1, it was found that the electrode materials for a lithium-ion secondary battery of Examples 1 to 6 had a mis-fit value of the bc plane of 1.53% or more and 1.82% or less, and thus the ratio L/R of the value L of the constant electric current charge capacity of $LiFe_xMn_{1-w-x-y-z}Mg_yCa_zA_wPO_4$ at an electric current density of 3 CA and an upper limit voltage of 4.3 V, which was measured at 25° C., to the value R of the constant electric current charge capacity of $LiFe_xMn_{1-w-x-y-z}Mg_yCa_zA_wPO_4$ at an electric current density of 0.1 CA and an upper limit voltage of 4.3 V, which was measured at 25° C., was 0.575 or more, and the value R of the constant electric current charge capacity of $LiFe_xMn_{1-w-x-y-z}Mg_yCa_zA_wPO_4$ at an electric current density of 0.1 CA and an upper limit voltage of 4.3 V, which was measured at 25° C., was 140.2 mAh/g or more.

On the other hand, it was found that the electrode materials for a lithium-ion secondary battery of Comparative Examples 1 to 8 had a mis-fit value of the bc plane of 1.29 or less and 1.87 or more, and thus the ratio L/R of the value L of the constant electric current charge capacity of $LiFe_xMn_{1-w-x-y-z}Mg_yCa_zA_wPO_4$ at an electric current density of 3 CA and an upper limit voltage of 4.3 V, which was measured at 25° C., to the value R of the constant electric current charge capacity of $LiFe_xMn_{1-w-x-y-z}Mg_yCa_zA_wPO_4$ at an electric current density of 0.1 CA and an upper limit voltage of 4.3 V, which was measured at 25° C., was 0.460 or more and 0.539 or less, and the value R of the constant electric current charge capacity of $LiFe_xMn_{1-w-x-y-z}Mg_yCa_zA_wPO_4$ at an electric current density of 0.1 CA and an upper limit voltage of 4.3 V, which was measured at 25° C., was 143.9 mAh/g or less.

The electrode material for a lithium-ion secondary battery of the present invention includes particles which are made of $LiFe_xMn_{1-w-x-y-z}Mg_yCa_zA_wPO_4$ (here, A represents at least one element selected from the group consisting of Co, Ni, Zn, Al, and Ga, $0.05 \leq x \leq 0.35$, $0.01 \leq y \leq 0.10$, $0.0001 \leq z \leq 0.001$, and $0 \leq w \leq 0.02$), have an orthorhombic crystal structure, and have a space group of Pmna, in which a mis-fit value $[(1-(b2 \times c2)/(b1 \times c1)) \times 100]$ of a bc plane which is computed from lattice constants b1 and c1 of the $LiFe_xMn_{1-w-x-y-z}Mg_yCa_zA_wPO_4$ and lattice constants b2 and c2 of $Fe_xMn_{1-w-x-y-z}Mg_yCa_zA_wPO_4$ obtained by deintercalating Li from $LiFe_xMn_{1-w-x-y-z}Mg_yCa_zA_wPO_4$ by means of an oxidation treatment using nitrosonium tetrafluoroborate in acetonitrile is 1.32% or more and 1.85% or less, and thus lithium-ion secondary batteries including electrodes for lithium-ion secondary batteries which are produced using this electrode material for a lithium-ion secondary battery have a high discharge capacity and a high energy density at a low temperature or during high-speed charge and discharge, and thus it is possible to apply the present invention to next-generation secondary batteries from which a higher voltage, a higher energy density, higher load characteristics, and higher-speed charge and discharge characteristics are expected, and in the case of next-generation secondary batteries, the effects are extremely strong.

What is claimed is:

1. An electrode material for a lithium-ion secondary battery comprising:
   particles which are made of $LiFe_xMn_{1-w-x-y-z}Mg_yCa_zA_wPO_4$ (wherein A represents at least one element selected from the group consisting of Co, Ni, Zn, Al, and Ga, $0.05 \leq x \leq 0.035$, $0.01 \leq y \leq 0.10$, $0.0001 \leq z \leq 0.001$, and $0 \leq w \leq 0.002$, and have an orthorhombic crystal structure with a space group of Pnma,
   wherein a mis-fit value of a bc plane is 1.32% to 1.85%, wherein the mis-fit value is represented by the formula $(1-(b2 \times c2)/(b1 \times c1)) \times 100$ and is calculated from lattice constants b1 and c1 of the $LiFe_xMn_{1-w-x-y-z}Mg_yCa_zA_wPO_4$ and lattice constants b2 and c2 of the $Fe_xMn_{1-w-x-y-z}Mg_yCa_zA_wPO_4$ obtained by deintercalating Li from the $LiFe_xMn_{1-w-x-y-z}Mg_yCa_zA_wPO_4$ by means of an oxidation treatment using nitrosonium tetrafluoroborate in acetonitrile.

2. A lithium-ion secondary battery comprising the electrode material for a lithium-ion secondary battery according to claim 1, wherein a ratio L/R of a value L of a constant electric current charge capacity of $LiFe_xMn_{1-w-x-y-z}Mg_yCa_zA_wPO_4$ at an electric current density of 3 CA and an upper limit voltage of 4.3 V, which is measured at 25° C., to a value R of the constant electric current charge capacity of $LiFe_xMn_{1-w-x-y-z}Mg_yCa_zA_wPO_4$ at an electric current density of 0.1 CA and an upper limit voltage of 4.3 V, which is measured at 25° C., is 0.55 or more.

3. The lithium-ion secondary battery according to claim 2, wherein a Li diffusion coefficient computed from a peak between 3.6 V and 4.2 V of the cyclic voltammetry of $LiFe_xMn_{1-w-x-y-z}Mg_yCa_zA_wPO_4$, which is measured at 25° C., is $1.0 \times 10^{-12}$ or more and $1.0 \times 10^{-10}$ or less.

4. A method for manufacturing the electrode material for a lithium-ion secondary battery according to claim 1, comprising:

a step of heating a raw material slurry α including a Li source, a Fe source, a Mn source, a Mg source, a Ca source, a P source, and an A source to a temperature in a range of 150° C. or higher and 250° C. or lower, thereby synthesizing $LiFe_xMn_{1-w-x-y-z}Mg_yCa_zA_wPO_4$ particles under pressure;

a step of drying a raw material slurry β obtained by dispersing the $LiFe_xMn_{1-w-x-y-z}Mg_yCa_zA_wPO_4$ particles in a water solvent including a carbon source, granulating the raw material slurry, and then heating the raw material slurry to a temperature in a range of 500° C. or higher and 860° C. or lower, thereby coating surfaces of $LiFe_xMn_{1-w-x-y-z}Mg_yCa_zA_wPO_4$ primary particles with a carbonaceous film and obtaining an electrode material for a lithium-ion secondary battery; and a step of mixing the electrode material for a lithium-ion secondary battery with a solution obtained by adding nitrosonium tetrafluoroborate to acetonitrile as an oxidant, thereby performing chemical Li deintercalation and setting a mis-fit value of a bc plane to 1.32% to 1.85%, wherein the mis-fit value is represented by the formula $(1-(b2 \times c2)/(b1 \times c1)) \times 100$ and is calculated from lattice constants b1 and c1 of the $LiFe_xMn_{1-w-x-y-z}Mg_yCa_zA_wPO_4$ and lattice constants b2 and c2 of the $Fe_xMn_{1-w-x-y-z}Mg_yCa_zA_wPO_4$ obtained by deintercalating Li from the $LiFe_xMn_{1-w-x-y-z}Mg_yCa_zA_wPO_4$.

\* \* \* \* \*